Figure 1:
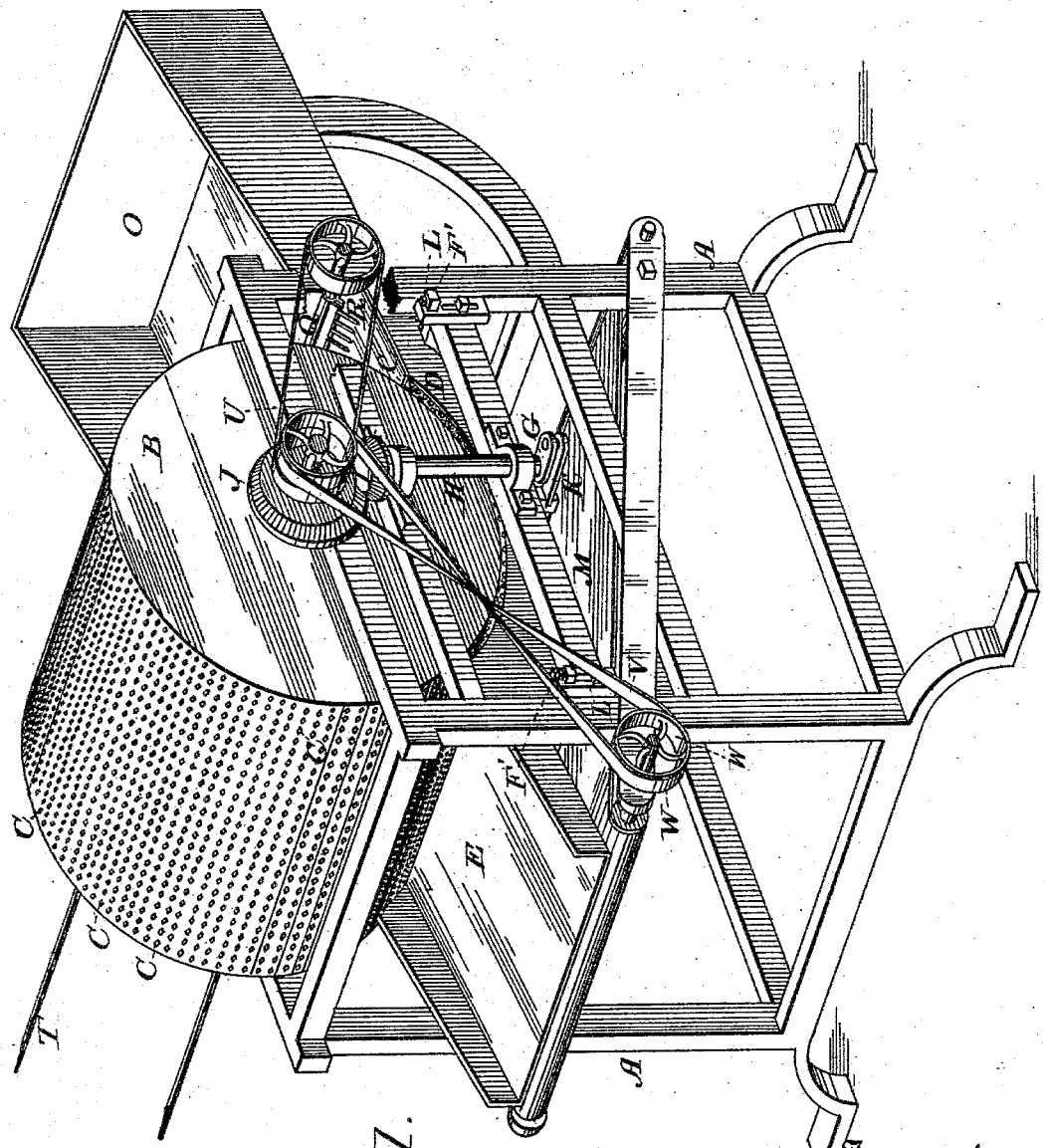

(No Model.) 3 Sheets—Sheet 1.

A. SWINGLE.
MACHINE FOR THRASHING AND SEPARATING GRAIN, PEAS, &c.

No. 295,305. Patented Mar. 18, 1884.

Witnesses:
Geo. H. Strong.
J. H. Nourse.

Inventor,
Alfred Swingle
Dewey & Co.
Attorneys (No Model.) 3 Sheets—Sheet 2.
A. SWINGLE.
MACHINE FOR THRASHING AND SEPARATING GRAIN, PEAS, &c.
No. 295,305. Patented Mar. 18, 1884.
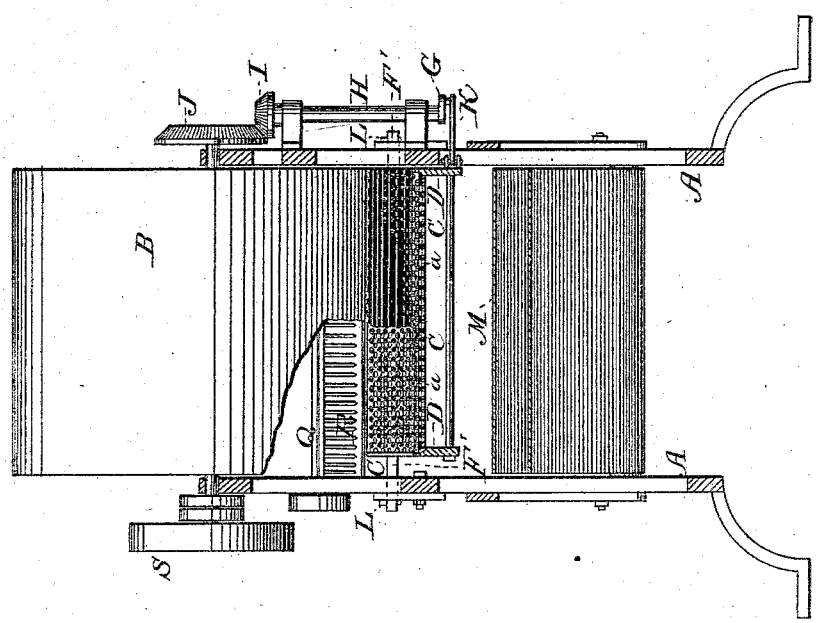
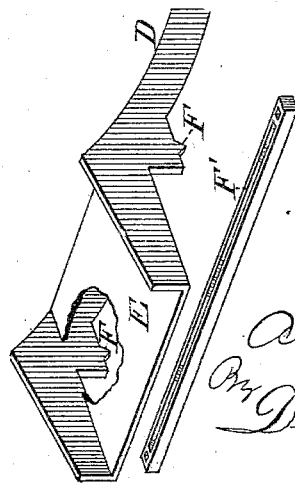

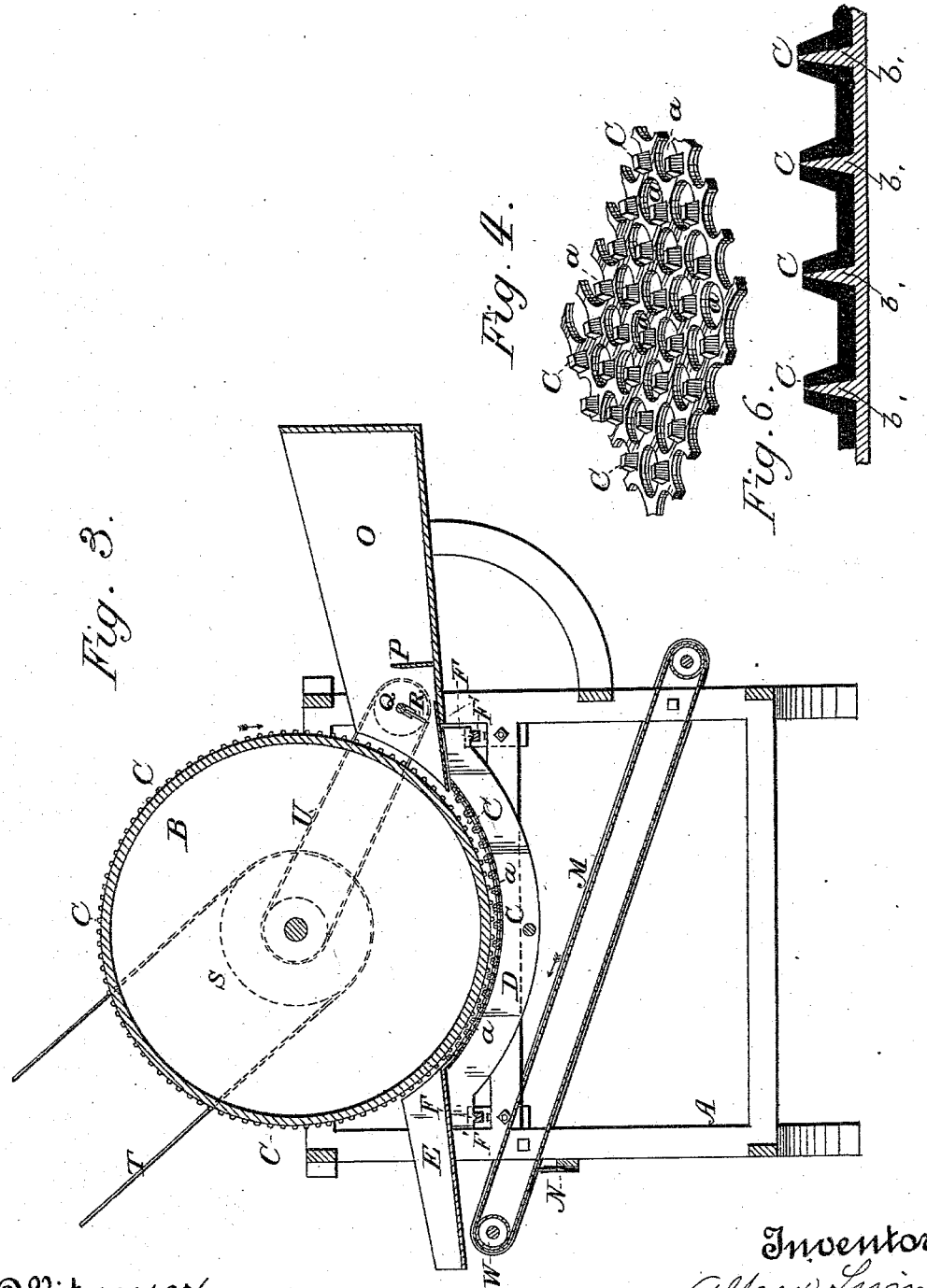

UNITED STATES PATENT OFFICE.

ALFRED SWINGLE, OF SAN FRANCISCO, CALIFORNIA.

MACHINE FOR THRASHING AND SEPARATING GRAIN, PEAS, &c.

SPECIFICATION forming part of Letters Patent No. 295,305, dated March 18, 1884.

Application filed December 11, 1883. (No model.)

*To all whom it may concern:*

Be it known that I, ALFRED SWINGLE, of the city and county of San Francisco, and State of California, have invented Improvements in Machines for Thrashing and Separating Grain, Peas, &c.; and I do hereby declare the following to be a full, clear, and exact description thereof.

My invention relates to an apparatus for shelling peas or beans, separating coffee, rice, or oats from the exterior husk, and for similar purposes; and it consists in the combination of devices hereinafter explained and claimed, all of which will be more fully explained by referring to the accompanying drawings, in which—

Figure 1, Sheet 1, is a perspective view of my apparatus. Fig. 2, Sheet 2, is an end view, with a part of the casing and cylinder broken away. Fig. 3, Sheet 3, is a vertical section taken transverse to the shaft. Fig. 4, Sheet 3, is an enlarged view of the perforated concave rubber. Fig. 5, Sheet 2, is a view of a section of the concave, showing the guides. Fig. 6, Sheet 3, is a section of the elastic covering and protuberances, with the interior pins.

A is a frame, upon which are fixed journal-boxes supporting the shaft of a cylinder, B, of considerable diameter. The surface of this cylinder is covered with rubber, which is, for convenience, formed in sheets or sections, and may be vulcanized or otherwise secured directly to the surface of the cylinder. The surface of this elastic covering has points of projections C rising from it a short distance apart, and they may be stiffened by means of iron pins $b$, Fig. 6, which extend up into each of the points.

Beneath the cylinder, and in close proximity to it, is the concave D, which forms an arc of a length suited to the work to be done. When it is to be used for hulling rice or oats, the concave is made tight, and an elastic sheet with points similar to those upon the cylinder is fixed to it. In this case the curve of the concave may extend but a short distance beyond the lowest point of the cylinder in the direction of its rotation, in order that the grains and husks may be readily discharged over its edge and conveyed away to be separated.

When the apparatus is to be used for peas or beans, the concave is made with holes $a$ between the projections C, to provide a means for discharging the peas, while the pods are carried out over the edge and into a discharge-chute, E.

In construction, I prefer to make the concave of iron and vulcanize the sheet of rubber upon it. The metal plate has short projections formed upon its surface, so that the diamond-shaped projections of the rubber will each contain one of those points, which serves to stiffen it, and hold it rigidly enough for the work to be done.

The concave D has V-shaped projections F at each side, as shown in Figs. 3 and 5, and each end, and these travel in similarly-shaped guides, F'; or, if preferred, other forms of guides may be employed upon which the concave is moved or reciprocated parallel with the shaft, and transversely to the rotation of the cylinder. This reciprocation is effected by means of a crank or eccentric, G, fixed to a shaft H, which stands vertically, turning in journal-boxes at one side of the machine, and having a bevel-pinion, I, fixed to its upper end, to mesh with a bevel-gear wheel, J, upon the end of the cylinder-shaft. The crank or eccentric is connected with the concave by a pitman, K. The guides in which the concave is reciprocated are supported at each side, so as to be adjustable up or down by means of the slotted plates L, Fig. 1.

Beneath the concave is an endless traveling belt, M, placed at an inclination, as shown, so that the peas, falling through the holes $a$ upon it, will roll down and be discharged at the lower end, while the small pieces of pods and other worthless material which may pass through the holes and fall upon the belt will be carried up by it and discharged over the upper end. A piece of rubber or other elastic brush, N, is fixed to the frame just below the upper end of the belt, so that it will rub lightly upon the lower returning portion of the belt, and thus brush off any adhering particles, so that when the belt again moves up the incline its surface will be clean, and present no obstruction to the peas rolling down. The peas are first placed in a hopper or receptacle, O, which has a transverse partition, P, over which they fall, or are fed by hand or otherwise into the partition or chute nearest the cylinder, and which delivers them directly into the concave.

In order to disentangle and separate the pods from each other and deliver them regularly into the concave, a shaft, Q, is fitted to turn above the feed-chute, and has short arms or pickers, R, projecting from it, so as to act upon the pods as the shaft rotates. The main cylinder-shaft has a pulley, S, fixed to one end, and a belt, T, serves to drive it. A belt, U, from another pulley on this shaft, extends to a pulley upon the picker or feed-shaft, and drives it, while another belt, V, extends to a pulley, W, upon the upper roll or shaft, around which the traveling belt passes and drives it.

The operation will then be as follows: Peas being fed from the hopper into the concave, the cylinder rotates with the elastic diamond-shaped projections upon its surface in close proximity to the similar points upon the concave. This latter is caused to reciprocate transversely to the line of rotation of the cylinder, and the effect upon the pea-pods will be to roll and burst them, so that the peas will fall through the holes $a$ upon the upwardly-traveling inclined belt M, and roll down and discharge at the lower end. The pods are carried out of the concave by the rotation of the cylinder, and discharged through the chute E, while the small particles which may fall through with the peas will be carried up and discharged over the upper end of the belt. These peculiarly-actuated elastic rubbing-surfaces are very effective in denuding rice or oats of their husks, the operation being similar to that herein described, the elastic points being made smaller, and both surfaces being imperforate, so that the grain and husk are discharged together and afterward separated by a fan or other winnowing device.

Having thus described my invention, what I claim as new, and desire to secure by Letters Patent, is—

1. In a machine for thrashing and separating peas or grains from the outer husk or envelope, the combination of a cylinder the surface of which has an elastic covering with protuberances, a corresponding concave surface in close proximity below with similar protuberances, and a mechanism by which the concave is caused to reciprocate in a line parallel with the axis while the cylinder is rotated, substantially as herein described.

2. In a machine for thrashing and separating seeds from the outer envelope or husk, the combination of a cylinder and a reciprocating concave surface, below and through which the substances pass, said cylinder and concave having their surfaces provided with projections or protuberances and covered with sheets of elastic material, substantially as herein described.

3. In a machine for thrashing and separating seeds from the outer envelope or husk, the combination of a reciprocating concave surface, into which the materials are fed, and a cylinder rotating above the concave and in close proximity thereto, the surfaces of both being provided with elastic protuberances, having rigid internal pins, $b$, substantially as herein described.

4. In a machine for thrashing and separating seeds from the outer pod or envelope, the combination of a reciprocating concave, into which the substances are fed, with elastic protuberances upon the surface and holes between them, a cylinder with similar protuberances rotating in close proximity to the concave, and an inclined upwardly-traveling belt below the concave, substantially as herein described.

5. The rotating cylinder and the reciprocating concave situated below, having surfaces provided with elastic protuberances, which move in close proximity, in combination with the supply-chute, the transverse rotating shaft Q, and radial arms R, substantially as herein described.

In witness whereof I hereunto set my hand.

ALFRED SWINGLE.

Witnesses:
S. H. NOURSE,
C. D. COLE.